(12) United States Patent
Praharaj et al.

(10) Patent No.: US 11,413,804 B2
(45) Date of Patent: Aug. 16, 2022

(54) METHOD AND APPARATUS FOR EMBOSSING A SUBSTRATE

(71) Applicant: Xerox Corporation, Norwalk, CT (US)

(72) Inventors: Seemit Praharaj, Webster, NY (US); Michael Jon Levy, Webster, NY (US); Anthony S. Condello, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 250 days.

(21) Appl. No.: 15/889,892

(22) Filed: Feb. 6, 2018

(65) Prior Publication Data
US 2019/0240873 A1    Aug. 8, 2019

(51) Int. Cl.
| | | |
|---|---|---|
| *B29C 59/04* | (2006.01) |
| *B29C 33/38* | (2006.01) |
| *B41J 2/01* | (2006.01) |
| *D06C 23/04* | (2006.01) |
| *B29C 33/40* | (2006.01) |
| *B41M 5/00* | (2006.01) |
| *B41M 7/00* | (2006.01) |
| *B31F 1/07* | (2006.01) |
| *B29C 33/72* | (2006.01) |
| *B29C 35/08* | (2006.01) |

(52) U.S. Cl.
CPC ........ *B29C 59/046* (2013.01); *B29C 33/3842* (2013.01); *B29C 33/405* (2013.01); *B29C 33/72* (2013.01); *B31F 1/07* (2013.01); *B41J 2/01* (2013.01); *B41M 5/0088* (2013.01); *B41M 7/0081* (2013.01); *D06C 23/04* (2013.01); *B29C 2035/0827* (2013.01); *B29K 2821/00* (2013.01); *B29K 2901/00* (2013.01); *B29K 2995/0062* (2013.01); *B31F 2201/0753* (2013.01); *B31F 2201/0792* (2013.01)

(58) Field of Classification Search
CPC ...... B29C 33/3842; B29C 33/405; B31F 1/07
See application file for complete search history.

(56) References Cited

U.S. PATENT DOCUMENTS

| | | | | |
|---|---|---|---|---|
| 4,322,450 A | * | 3/1982 | Gray, III | D21H 27/02 427/362 |
| 5,527,497 A | * | 6/1996 | Kanome | B29C 43/222 425/327 |
| 2003/0108710 A1 | * | 6/2003 | Coyle | B29C 39/148 425/363 |
| 2009/0183644 A1 | * | 7/2009 | Bollettin | B41F 9/1018 101/167 |
| 2014/0061976 A1 | * | 3/2014 | Doersam | B41F 23/0406 264/479 |
| 2014/0319739 A1 | * | 10/2014 | Tombs | G03G 15/224 264/447 |

(Continued)

*Primary Examiner* — Abbas Rashid
*Assistant Examiner* — Wayne K. Swier

(57) ABSTRACT

An apparatus and method for embossing a substrate are disclosed. For example, the apparatus includes an embossing platform, a printhead to dispense ink on the embossing platform in a desired raised pattern on the embossing platform, a press to apply a load against a substrate placed on the desired raised pattern and the embossing platform to emboss the desired raised pattern onto the substrate, and an ink removal device to remove the ink that is dispensed on the embossing platform in the desired raised pattern.

4 Claims, 4 Drawing Sheets

(56) References Cited

U.S. PATENT DOCUMENTS

2015/0035268 A1* 2/2015 Lefebvre ............... B41M 3/14
283/74
2015/0158263 A1* 6/2015 Maddala ............... B31F 1/07
427/147

* cited by examiner

METHOD AND APPARATUS FOR EMBOSSING A SUBSTRATE

The present disclosure relates generally to embossing substrates and, more particularly, to embossing substrates with printed ink.

BACKGROUND

Embossing is used to provide a raised surface on substrates. The embossing provides a texture to substrates and can provide a three dimensional look to text and/or images that are printed on a substrate. For example, business cards, clothing fabric, holiday cards, paper marks, and the like can be embossed with text and/or images.

Currently, a template with desired text or images can be created to emboss a substrate. The template can be created with a hard plastic, metal, and the like. The template can be used to emboss the desired text or image onto a substrate. However, once the desired amount of the text or image is embossed, the template is disposed of. If many different types of text or images are used in a production run, a large amount of templates may be created and thrown away after use. This can lead to a large amount of waste and cost.

SUMMARY

According to aspects illustrated herein, there are provided an apparatus and a method for embossing a substrate. One disclosed feature of the embodiments is an apparatus comprising an embossing platform, a printhead to dispense ink on the embossing platform in a desired raised pattern on the embossing platform, a press to apply a load against a substrate placed on the desired raised pattern and the embossing platform to emboss the desired raised pattern onto the substrate, and an ink removal device to remove the ink that is dispensed on the embossing platform in the desired raised pattern.

Another disclosed feature of the embodiments is a method for embossing a substrate. The method may be performed by a processor. In one embodiment, the method controls a printhead to dispense ink on an embossing platform in a desired raised pattern, feeds a substrate onto the desired raised pattern on the embossing platform, and moves a press towards the embossing platform to apply a load against the substrate and the embossing platform to emboss the substrate with the desired raised pattern.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses an apparatus and method for embossing a substrate. As discussed above, embossing can be used to provide a raised surface on substrates. The embossing provides a texture to substrates and can provide a three dimensional look to text and/or images that are printed on a substrate. For example, business cards, clothing fabric, holiday cards, paper marks, and the like can be embossed with text and/or images.

However, currently used methods for embossing can lead to large amounts of waste. As a result, the cost to emboss substrates can be higher as a new template must be created for each new design.

Embodiments of the present disclosure provide an apparatus and method for embossing a substrate that can used ink to print a desired raised image on an embossing platform. The ink can be applied and dried to a height that is sufficient to emboss a substrate (e.g., a paper, plastic, cloth, and the like). The ink can then be removed and the embossing platform can be reused by printing a different raised pattern on the embossing platform.

In one example, the ink can be a water soluble ultra violet (UV) ink. The water soluble UV ink can be easily dissolved off of the embossing platform via water. The surface of the embossing platform can be cleaned and the new raised pattern can be printed on the embossing platform to emboss a different image on the substrate or different substrate.

Thus, new patterns for embossing a substrate can be easily prepared with little waste. In addition, the apparatus may be deployed as part of a continuous process that can improve the efficiency of embossing the substrate.

Figure 1:
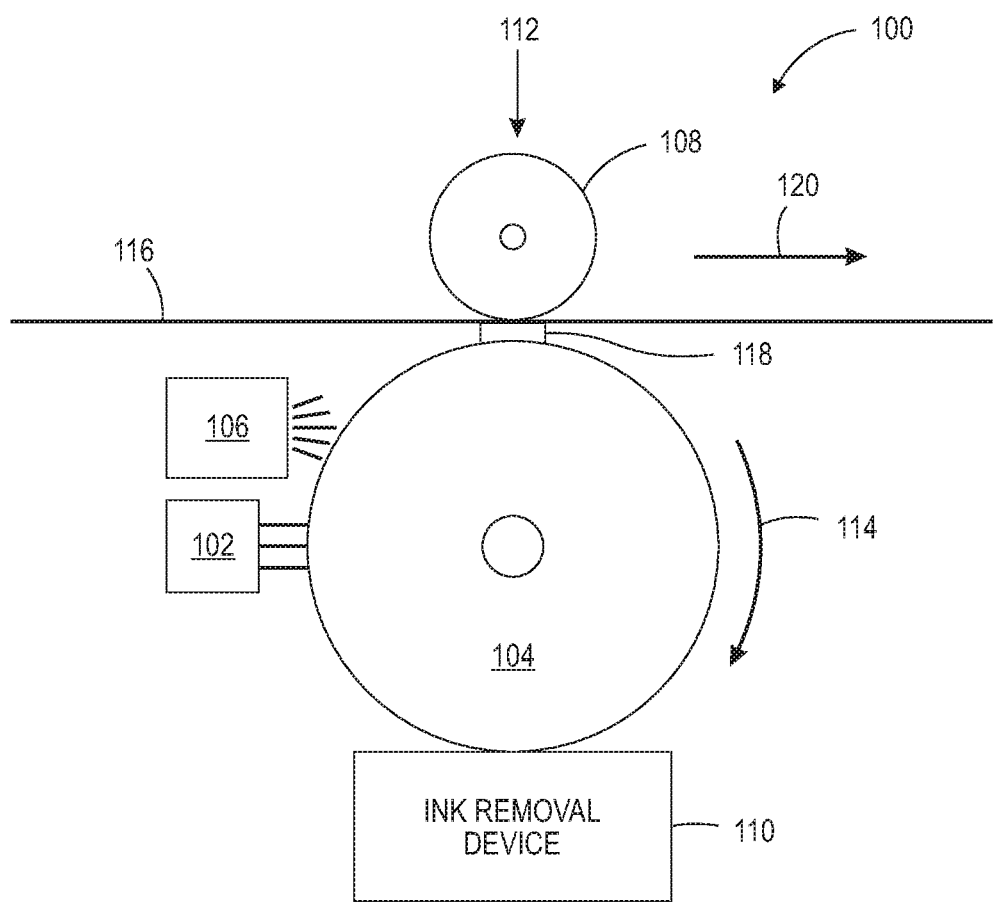
FIG. 1 illustrates a block diagram of a side view of an example embossing apparatus of the present disclosure.

FIG. 1 illustrates an example embossing apparatus 100 of the present disclosure. The embossing apparatus 100 may include an embossing platform 104. The embossing platform 104 may be plastic, rubber, or any type of material that may receive an ink that is dispensed by a printhead 102. In one embodiment, the embossing platform 104 may be a drum or a cylinder that can rotate around an axis that goes into the page as shown by an arrow 114. The embossing platform 104 may be a drum or a cylinder for continuous processing or batch processing. However, it should be noted that the embossing platform 104 may be a flat or planar shape, or any other type of shape for batch processing.

In one embodiment, the printhead 102 may dispense ink onto a surface of the embossing apparatus 100 in a desired raised pattern 118. For example, the printhead 102 may dispense multiple passes or layers of ink to form the desired raised pattern 118, which may be any type of pattern such as text, an image, a logo, a graphic, or any combination thereof. Although a single printhead 102 is illustrated in FIG. 1, it should be noted that printhead 102 may comprise a plurality of printheads 102 that each print different colors.

In one embodiment, the ink may be a water soluble UV ink. For example, the water soluble UV ink may be dried via UV light rays by a UV curing station 106. In one embodiment, the printhead 102 and the UV curing station 106 may be part of the embossing apparatus 100. In another embodiment, the printhead 102 and the UV curing station 106 may be a separate device. The embossing platform 104 may be placed into the separate device to have the desired raised pattern 118 printed and dried. Then the embossing platform 104 may be removed and placed into the embossing apparatus 100.

The water soluble UV ink may allow the desired raised pattern 118 to be easily removed by an ink removal device 110. As discussed in further detail below, the ink removal device 110 may apply water to the desired raised pattern 118 to dissolve or solubilize the desired raised pattern 118 and then wipe clean the surface of the embossing platform 104. A new desired raised pattern 118 may then be printed by the printhead 102 and cured by the UV curing station 106.

Although the examples above describe an example with a water soluble UV ink, it should be noted that any type of ink that can be removed can be used. For example, non-water soluble UV inks may be scraped off by the ink removal device 110, or UV inks that are soluble with other liquids or solvents may be used.

In one embodiment, after the desired raised pattern 118 is printed, or dispensed, onto the surface of the embossing platform 104, the embossing platform 104 may be rotated into an embossing position. The embossing position may be defined as when the desired raised pattern 118 is adjacent to a substrate 116 and aligned with and below a press 108. After the embossing of the substrate 116 is complete, the substrate 116 may be moved in a direction shown by an arrow 120.

Another substrate 116 may be placed over the desired raised pattern 118 for a batch process, or a continuous roll of the substrate 116 may be fed through the embossing apparatus 100 for a continuous process. In one embodiment, if the same desired raised pattern 118 is used, the press 108 may be moved towards the substrate 116 and the embossing platform 104 after the substrate 116 is properly positioned. If a different desired raised pattern 118 is used, the embossing platform 104 may be rotated towards the ink removal device 110 to remove the desired raised pattern 118. Then the embossing platform 104 may be rotated again towards the printhead 102 to dispense the ink into a new desired raised pattern 118 and cured by the UV curing station 106. The embossing platform 104 may be rotated again into the embossing position to emboss the new desired raised pattern 118 onto the substrate 116.

In one example, when a sequence of desired raised patterns 118 are known, a plurality of desired raised patterns 118 may be printed onto the surface of the embossing platform 104. Thus, as one desired raised pattern 118 is being used to emboss the substrate 116, a different desired raised pattern 118 may be printed and cured. Thus, as the embossing platform 104 is rotated, the next desired raised pattern 118 may be used to emboss the substrate 116. Simultaneously, the used desired raised pattern 118 may be removed by the ink removal device 110 and another new desired raised pattern 118 may be printed and cured. Thus, the same embossing platform 104 may be used to emboss different patterns on the substrate 116 in a continuous and efficient process.

In one example, the substrate 116 may be any type of pliable material such as paper, cloth, a plastic, and the like. In one example, the press 108 may be a rubber material formed into a rotating drum or a cylindrical shape. In one example, the press 108 may have a shape that is similar to the embossing platform 104. For example, if the embossing platform 104 was a rectangular shape, then the press 108 may also have a rectangular shape, and so forth.

Figure 2:
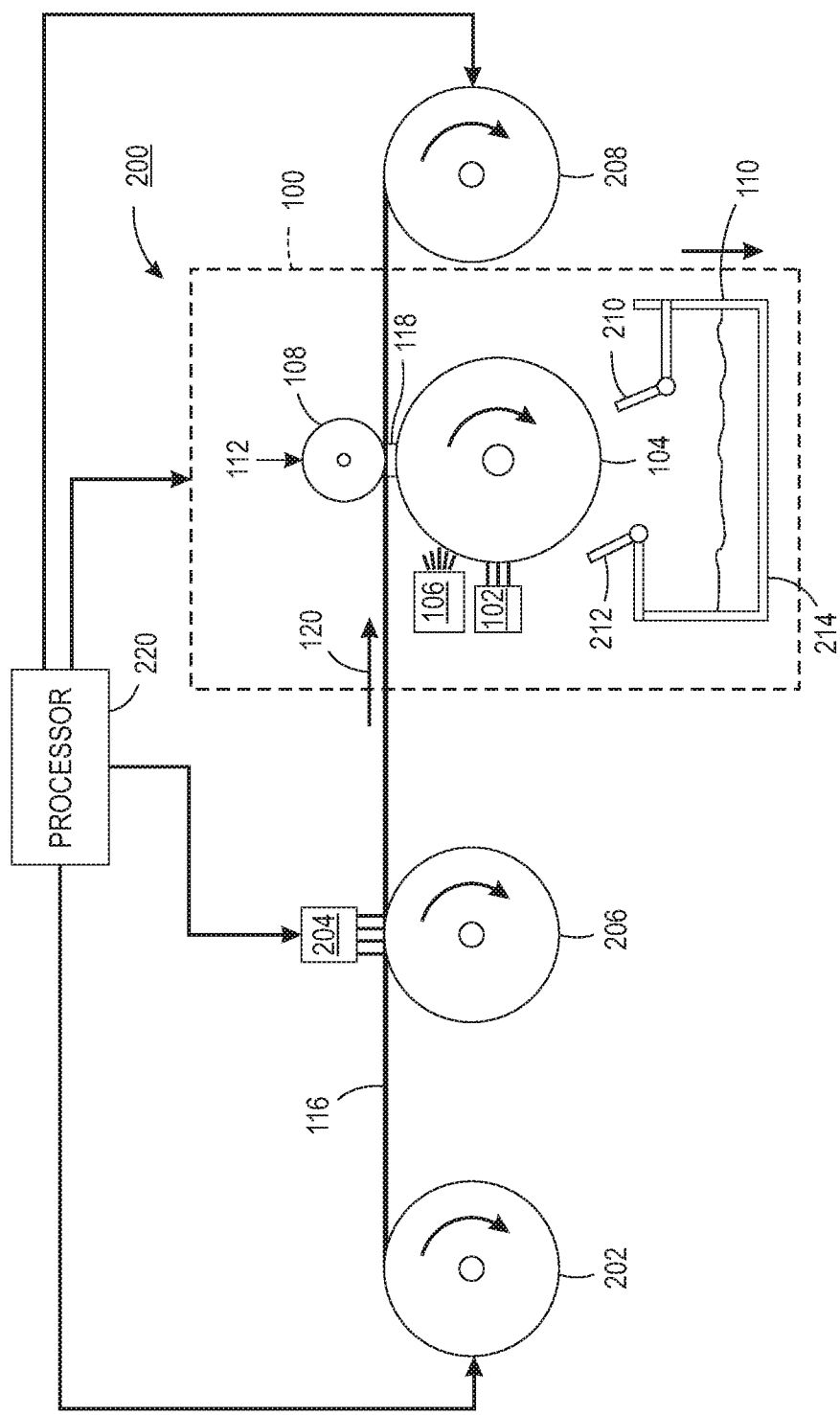
FIG. 2 illustrates a block diagram of a side view of an example apparatus of the present disclosure with the embossing apparatus.

FIG. 2 illustrates a block diagram of a side view of an example apparatus 200 of the present disclosure. The apparatus 200 may be a printing system that includes the embossing apparatus 100.

In one embodiment, the apparatus 200 may perform a continuous process that allows the substrate 116 to be continuously fed in a direction shown by the arrow 120. For example, the substrate 116 may be on a paper feed 202 (e.g., a roll of the substrate 116) and collected by a substrate collector 208 (e.g., a roll that collects or takes-up the substrate 116 after processing).

In one embodiment, the apparatus 200 may print an image via an upstream printhead 204 and an imaging drum 206. For example, the upstream printhead 204 may print a two dimensional image, or desired pattern, generated by the imaging drum 206 onto the substrate 116 via any type of ink. The upstream printhead 204 may be an inkjet printhead. Although a single upstream printhead 204 is illustrated in FIG. 2, it should be noted that the upstream printhead 204 may comprise a plurality of upstream printheads 204 that each print a different color.

After the desired pattern is printed onto the substrate 116, a desired pattern may be embossed by the embossing apparatus 100. FIG. 2 illustrates a more detailed block diagram of the ink removal device 110 for the embossing apparatus 100 that uses a water soluble UV ink. For example, the ink removal device 110 may include a water spray 210, a blade 212, and a container 214. The operation of the water spray, 210, the blade 212 and the container 214 are discussed in further detail below in conjunction with a clean-up operation illustrated in FIG. 3.

In one embodiment, a desired raised pattern 118 may be printed onto the embossing platform 104, as described above. In one embodiment, the desired raised pattern 118 may correspond to the desired pattern printed by the upstream printhead 204. For example, the desired raised pattern 118 may be the same as the desired pattern printed by the upstream printhead 204.

After the desired raised pattern 118 is printed by the printhead 102 and cured by the UV curing station 106, the embossing platform 104 may be rotated to an embossing position. For example, the desired raised pattern 118 may be aligned with the desired pattern printed onto the substrate 116 and aligned with the press 108.

The press 108 may be moved towards the substrate 116 and the embossing platform 104 to apply the load 112 that causes the desired pattern to be embossed with the desired raised pattern 118. The press 108 may be moved away from the substrate 116 and the embossing platform 104 and the substrate 116 may be collected by the substrate collector 208.

In one example, the process may be repeated to emboss a desired amount of the substrate with the desired raised pattern 118. In one example, the embossing apparatus 100 may be deactivated. Thus, the upstream printhead 204 may print a desired pattern on the substrate 116 without embossing the desired pattern.

In one embodiment, a processor 220 may be communicatively coupled to each component of the apparatus 200. For example, the processor 220 may control operation of the paper feed 202, the upstream printhead 204, the imaging drum 206, the embossing apparatus 100 and each component within the embossing apparatus, and the substrate collector 208. The processor 220 may be a controller or a computer having a computer readable storage medium storing instructions that are executed by the processor 220. For example, the instructions may be associated with a method such as a method 400 illustrated in FIG. 4, and described below.

Figure 3:
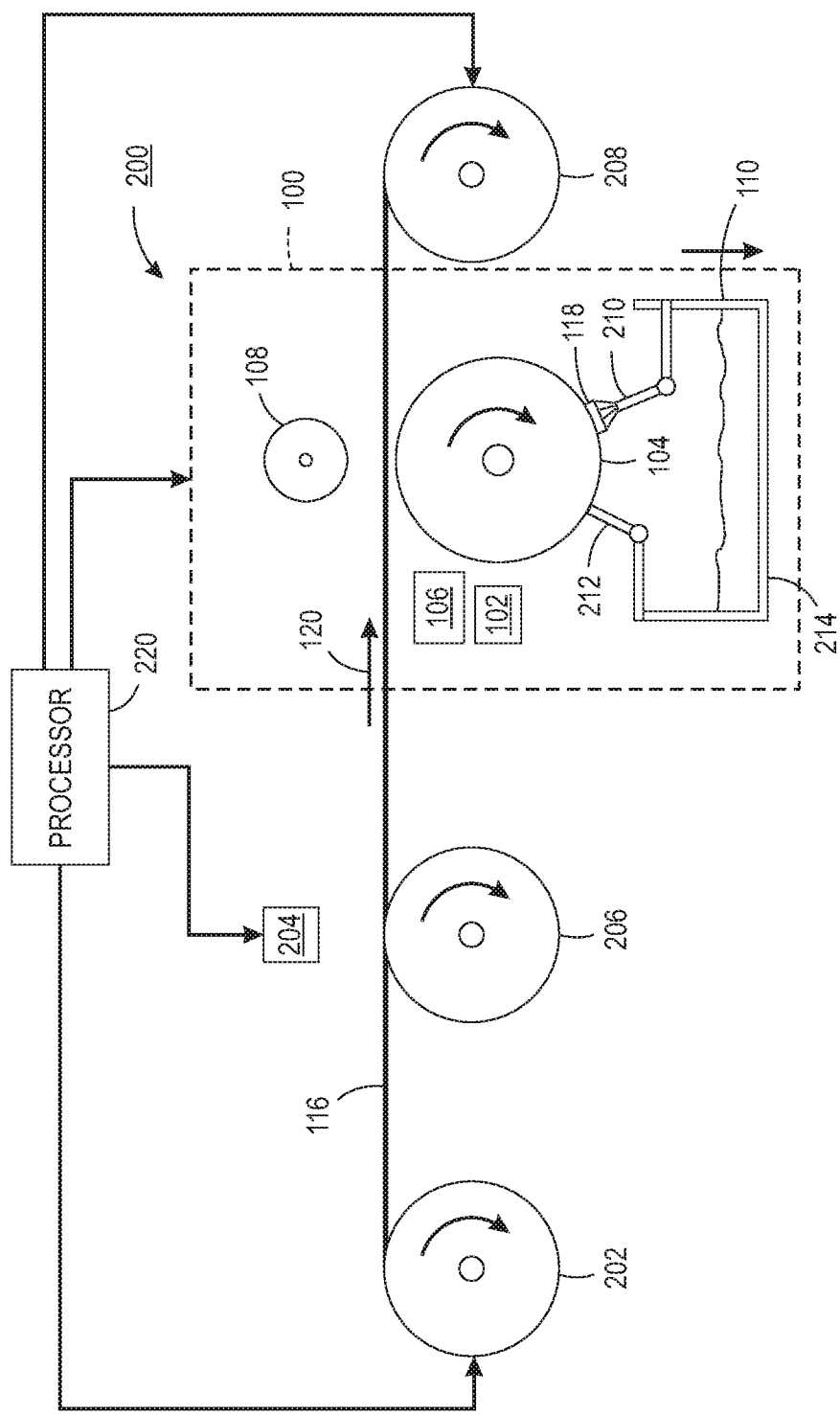
FIG. 3 illustrates a block diagram of a side view of the example apparatus of the present disclosure with the embossing apparatus in a clean-up operation.

In one embodiment, the desired raised pattern 118 may be removed and a new desired raised pattern 118 may be printed or dispensed onto the embossing platform 104. FIG. 3 illustrates a block diagram of a side view of the apparatus 200 in a clean-up operation.

In one embodiment, the press 108 may be moved away from the substrate 116 and have the load 112 removed. The embossing platform 104 may be rotated or moved such that the desired raised pattern 118 is aligned with the water spray 210. In the clean-up operation, the water spray 210 may be activated to spray water onto the water soluble UV ink that is used to print the desired raised image 118.

In one embodiment, the water may be held or stored in the container 214. The water may be recycled from the container 214. For example, the inlet of the water spray 210 may be below the water level in the container 214. A pump or other means can be used to move the water from the container 214 and out of the water spray 210. The water and the dissolved water soluble UV ink may be collected in the container 214 located below the embossing platform 104. A filter may be used to prevent the particles of the dissolved water soluble UV ink from entering the water spray 210. In another example, the water may be provided via a separate source or inlet to the water spray 210.

In one example, the water spray 210 may be pressurized to emit a high velocity stream of water. The high velocity stream of water may help to improve removal of the water soluble UV ink from the surface of the embossing platform 104.

After the water soluble UV ink is dissolved or solubilized from the surface of the embossing platform 104, the embossing platform 104 may be rotated. As the embossing platform 104 is being rotated, the blade 212 may be moved into a clean-up position. The clean-up position may be a position that is in contact with or pressed against the embossing platform 104. For example, a side or an edge of the blade 212 may press against the surface of the embossing platform 104 as the embossing platform 104 is rotated towards the printhead 102. The blade 212 may scrape off, or clean, any remaining residue, liquid, loose debris, and the like, from the surface of the embossing platform 104. Said another way, the blade 212 may "squidgy" the surface of the embossing platform 104 as the embossing platform 104 is being rotated. In one embodiment, the embossing platform 104 may be rotated in multiple passes against the blade 212 to ensure that the surface of the embossing platform 104 is ready for another desired raised pattern 118.

In one embodiment, the blade 212 may be a rubber material. In another embodiment, the blade 212 may be a plastic, a brush, an absorbent wipe or cloth, or any other type of material that that can clean the surface of the embossing platform 104. In another embodiment, where a non-water soluble UV ink is dispensed, the blade 212 may be a metal or hard plastic that can scrape off the desired raised pattern 118.

After the surface of the embossing platform 104 is cleaned, the printhead 102 may dispense ink in a new desired raised pattern 118 onto the embossing platform 104. The blade 212 may be moved into an embossing operation (e.g., moving the blade 212 out of contact with the surface of the embossing platform 104) and the water spray 210 may be deactivated. In one example, the container 214 may have a movable lid that may close to ensure that the water does not splash up onto the embossing platform 104 during the embossing operation. Thus, the embossing operation illustrated in FIG. 2 and the clean-up operation illustrated in FIG. 3 may be repeated continuously. For example, the embossing operation and the clean-up operation may be repeated for each different desired raised pattern 118 that is printed onto the embossing platform 104 and embossed into the substrate 116.

Figure 4:
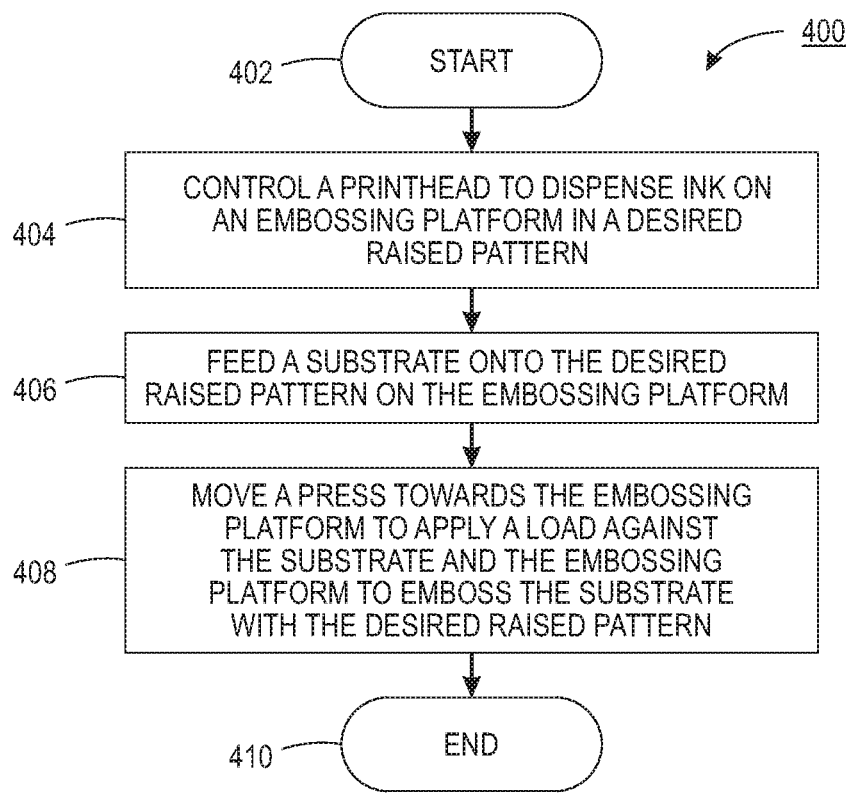
FIG. 4 illustrates a flowchart of an example method for embossing a substrate.
Figure 5:
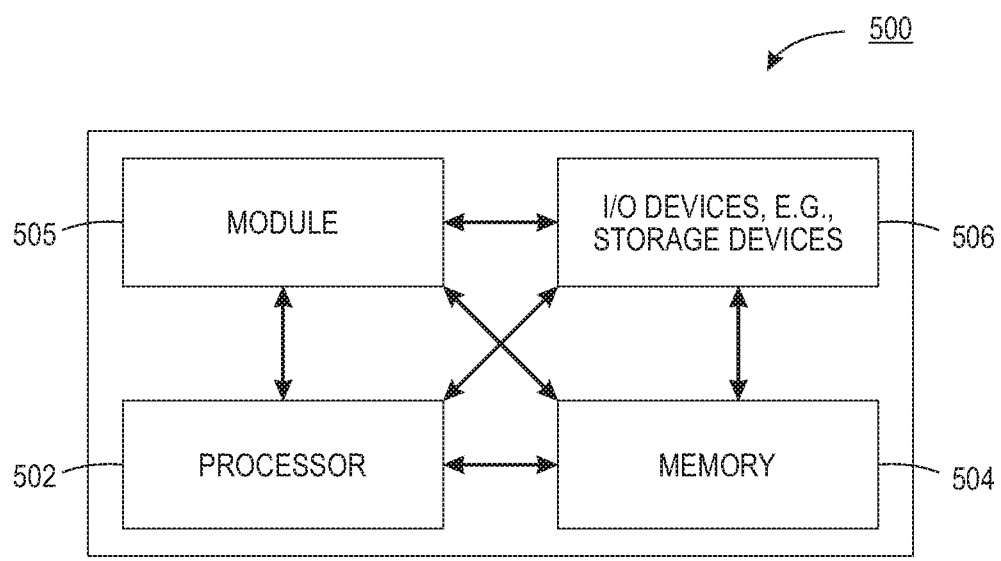
FIG. 5 illustrates a high-level block diagram of an example computer suitable for use in performing the functions described herein.

FIG. 4 illustrates a flowchart of an example method 400 for embossing a substrate. In one embodiment, one or more steps or operations of the method 400 may be performed by the embossing apparatus 100, the apparatus 200, or a computer/processor that controls operation of the apparatus 200 as illustrated in FIG. 5 and discussed below.

At block 402, the method 400 begins. At block 404, the method 400 controls a printhead to dispense ink on an embossing platform in a desired raised pattern. For example, the ink may be a water soluble UV ink. The ink may be dispensed onto a surface of the embossing platform to print the desired raised pattern. The desired raised pattern may be text, an image, or a combination thereof. The desired raised pattern may be printed to be "raised" enough to emboss a substrate. For example, the ink may be dispensed to print the desired raised pattern to have a height of several millimeters.

In one embodiment, the embossing platform may be rotated to move the desired raised pattern towards a UV curing station. The UV curing station may be activated to cure the ink by UV light emitted by the UV curing station. The curing may allow the ink that is dispensed onto the embossing platform to be hard enough to emboss the substrate.

After the ink is dispensed and cured, the embossing platform may be rotated into an embossing position. For example, the desired raised pattern may be positioned below a substrate that is to be embossed.

At block 406, the method 400 feeds a substrate onto the desired raised pattern on the embossing platform. The substrate may be any type of pliable material that can be embossed. For example, the substrate may be paper, cloth, a soft plastic, and the like.

In one embodiment, the substrate may be continuously fed via a continuous roll of the substrate. In one embodiment, an upstream printhead may print a desired pattern onto the substrate. The desired pattern may correspond to the desired raised pattern that will be used to emboss the desired pattern in the substrate.

At block 408, the method 400 moves a press towards the embossing platform to apply a load against the substrate and the embossing platform to emboss the substrate with the desired raised pattern. For example, the desired raised pattern may be aligned with the desired pattern and positioned below the press. The load may cause the desired raised pattern to emboss the substrate. For example, the desired pattern on the substrate may be embossed with the desired raised pattern that is dispensed on the surface of the embossing platform.

In one embodiment, the embossing platform may be rotated towards an ink removal device to remove the desired raised pattern and print a new desired raised pattern. A different raised pattern may be used to emboss a different text, image, or combination thereof.

In one embodiment, where a water curable UV ink is used to print the desired raised pattern, the embossing platform may be rotated towards a water spray. The water spray may spray water onto the desired raised pattern to dissolve or solubilize the water curable UV ink and remove the desired raised pattern. The water may be collected in a container located below the embossing platform.

The embossing platform may be rotated as the water spray is spraying water towards the embossing platform. In one embodiment, a blade may be moved into contact with the surface of the embossing platform. The blade may scrape or squidgy the surface of the embossing platform to dry and/or remove any residual ink that may be left on the surface of the embossing platform.

After the desired raised pattern is removed and the surface of the embossing platform is cleaned, the printhead may print a new desired raised pattern onto the embossing platform. Thus, the method 400 may be repeated (e.g., blocks 404, 406, and 408). The new desired raised pattern that is printed may be used to emboss the substrate or subsequent substrates that are fed over the desired raised pattern on the embossing platform. At block 410, the method 400 ends.

It should be noted that the blocks in FIG. 4 that recite a determining operation or involve a decision do not necessarily require that both branches of the determining operation be practiced. In other words, one of the branches of the determining operation can be deemed as an optional step. In addition, one or more steps, blocks, functions or operations of the above described method 400 may comprise optional steps, or can be combined, separated, and/or performed in a different order from that described above, without departing from the example embodiments of the present disclosure.

FIG. 5 depicts a high-level block diagram of a computer that is dedicated to perform the functions described herein. As depicted in FIG. 5, the computer 500 comprises one or more hardware processor elements 502 (e.g., a central processing unit (CPU), a microprocessor, or a multi-core processor), a memory 504, e.g., random access memory (RAM) and/or read only memory (ROM), a module 505 for embossing a substrate, and various input/output devices 506 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 505 for embossing a substrate (e.g., a software program comprising computer-executable instructions) can be loaded into memory 504 and executed by hardware processor element 502 to implement the steps, functions or operations as discussed above in connection with the example method 400. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 505 for embossing a substrate (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for embossing a substrate, comprising:
controlling, by a processor of an embossing apparatus, a printhead to dispense ink on a portion of an embossing platform in a first desired raised pattern, wherein the ink comprises a water soluble ultra violet (UV) ink;
activating, by the processor, a UV curing station to cure the water soluble UV ink after being dispensed onto the portion of the embossing platform;
feeding, by the processor, a substrate onto the first desired raised pattern on the embossing platform;
moving, by the processor, a press towards the embossing platform to apply a load against the substrate and the embossing platform to emboss the substrate with the first desired raised pattern;
controlling, by the processor, the printhead to dispense ink on a different portion of the embossing platform in a second desired raised pattern, while the first desired raised pattern is being embossed onto the substrate;
rotating, by the processor, the embossing platform towards a water spray located below the substrate and the embossing platform such that the first desired raised pattern is directed towards the water spray and the second desired raised pattern is directed towards the press and the substrate, wherein the water spray is located within the embossing apparatus;
causing, by the processor, the water spray to spray water on the first desired raised pattern to remove the first desired raised pattern while the second desired raised pattern is embossed onto the substrate;
moving, by the processor, a rubber blade into a clean-up position such that an edge of the rubber blade is in contact with a surface of the embossing platform;
rotating, by the processor, the embossing platform against the edge of the rubber blade after being sprayed with the water to clean a surface of the embossing platform;
repeating, by the processor, the feeding and the moving to allow a sequence of a plurality of desired raised patterns to be printed onto the surface of the embossing platform.

2. The method of claim 1, further comprising:
causing, by the processor, an upstream printhead to print a pattern that corresponds to the first desired raised pattern on the substrate.

3. The method of claim 1, wherein the feeding is performed continuously via a continuous roll of the substrate.

4. The method of claim 1, wherein the desired raised pattern comprises at least one of: text, an image, or the text and the image.

* * * * *